Jan. 2, 1951  R. F. KUNS  2,536,189
SPORTSMAN'S FITTED HOUSE TRAILER
Filed March 11, 1948  4 Sheets-Sheet 1

INVENTOR.
RAY F. KUNS.
BY
Murray, Sackhoff & Paddack.
ATTY.

Patented Jan. 2, 1951

2,536,189

UNITED STATES PATENT OFFICE 2,536,189

SPORTSMAN'S FITTED HOUSE TRAILER

Ray F. Kuns, Cincinnati, Ohio

Application March 11, 1948, Serial No. 14,345

5 Claims. (Cl. 214—65)

The present invention relates to so-called house trailers particularly of the type provided with built in furniture and conveniences adapting the trailer for comfortable dwelling accommodations during the various seasons of the year.

An object of the invention is to provide a trailer having a roof structure specifically adapted for carrying a boat, but which is exceptionally roadworthy and, at the same time, provides ample head room, light and ventilation for occupants.

Another important object of the invention is to provide a house trailer of this kind that is adapted to carry an ample sized boat on the roof thereof without adding appreciably to the top clearance required for the vehicle to pass through shop doors, or beneath bridges, viaducts and overhanging limbs of trees along the road or off the road.

Another object of the invention is to provide a trailer of this kind wherein strong relatively low and narrow longitudinal cat walks or roof decks are afforded on either side of the boat-carrying portion of the roof and telescoping davits are suitably located and housed substantially in the corners of the trailer for mounting a boat on and removing the boat from the roof of the trailer.

A further important object of the invention is to provide a trailer with a boat-shaped lantern roof structure disposed between low narrow cat walks, whereby the interior of the lantern roof structure provides comfortable head room in substantially all parts of the trailer that are not occupied by the built-in furniture and appliances and the exterior of said lantern roof serves in effect as a positioning means adapted to positively locate the gun-wales of the inverted boat for support on the roof decks immediately adjacent the junction of the lantern roof.

A still further object of the invention is a house trailer wherein the main body is relatively low and of a purely rectangular form readily adaptable to furnishing and living requirements but in which the appearance of streamlining effect is attained by the external application of formed horizontal frame members.

Still another object of the invention is to provide a boat-carrying house trailer wherein the entrance door header is disposed relatively close to the adjacent portion of the area enclosed by the lantern roof thus minimizing the chance of users bumping their heads on entering or leaving the trailer.

These and other objects are attained by the means described herein and exemplified in the accompanying drawings, in which:

Fig. 7 is a fragmental sectional view taken on line 7—7 of Fig. 3.

Figure 1:
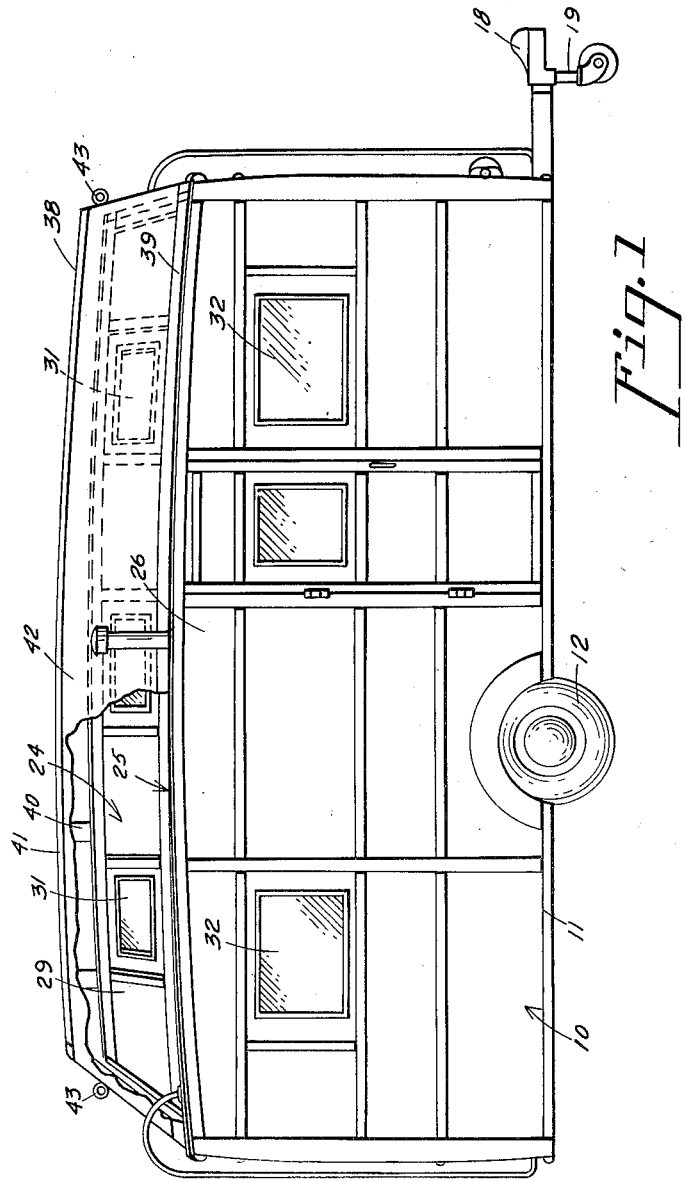
Fig. 1 is a side elevational view showing one side of a trailer of the invention showing the boat in position for transportation and partly broken away to disclose details of the lantern roof of said trailer.

Heretofore in the construction of house trailers a continuous roof of a nearly flat or of a generally curved type has been used and such roof has provided a ceiling height within the trailer that is generally convenient for persons of medium height. If such trailer of ordinary construction be built with sufficient head room for taller persons, and used to transport a boat on the roof thereof, roadworthiness is sacrificed as the center of gravity is raised and danger of tipping over is increased. In any event the interior of previously known trailers is generally dark and poorly ventilated in the upper portion so that persons standing therein are seldom comfortable. In the case of trailers built to provide greater head room the space over the top of the taller pieces of built in furniture, and the like, serves to trap the heat of cooking operations, as well as of lights used in the trailer regardless of whether this space is used for random storage of articles when the trailer is not on the road.

In the embodiment of the invention illustrated the trailer 10 comprises a flat platform floor structure 11 of suitable construction supported tractionally upon a pair of road wheels 12, set in recessed relation to the side edges 13 of the floor platform 11. This platform 11 in the present structure comprises a connected series of members 14 and 15 on the top of which the trailer floor proper 16 is secured rigidly and in mutually reenforcing relation by any suitable means. A bottom cover 160 may be used for added strength and security as shown. Fixed to and projecting from the front end of the floor structure 11 is a rigid frame 17 provided at the extreme end with a towing coupling 18 whereby the trailer is attached to an automobile for road travel. A caster wheel device 19 is provided for use in conjunction with wheels 12 to support the floor structure 11 in a solid level condition when the trailer is detached as illustrated.

Figure 3:
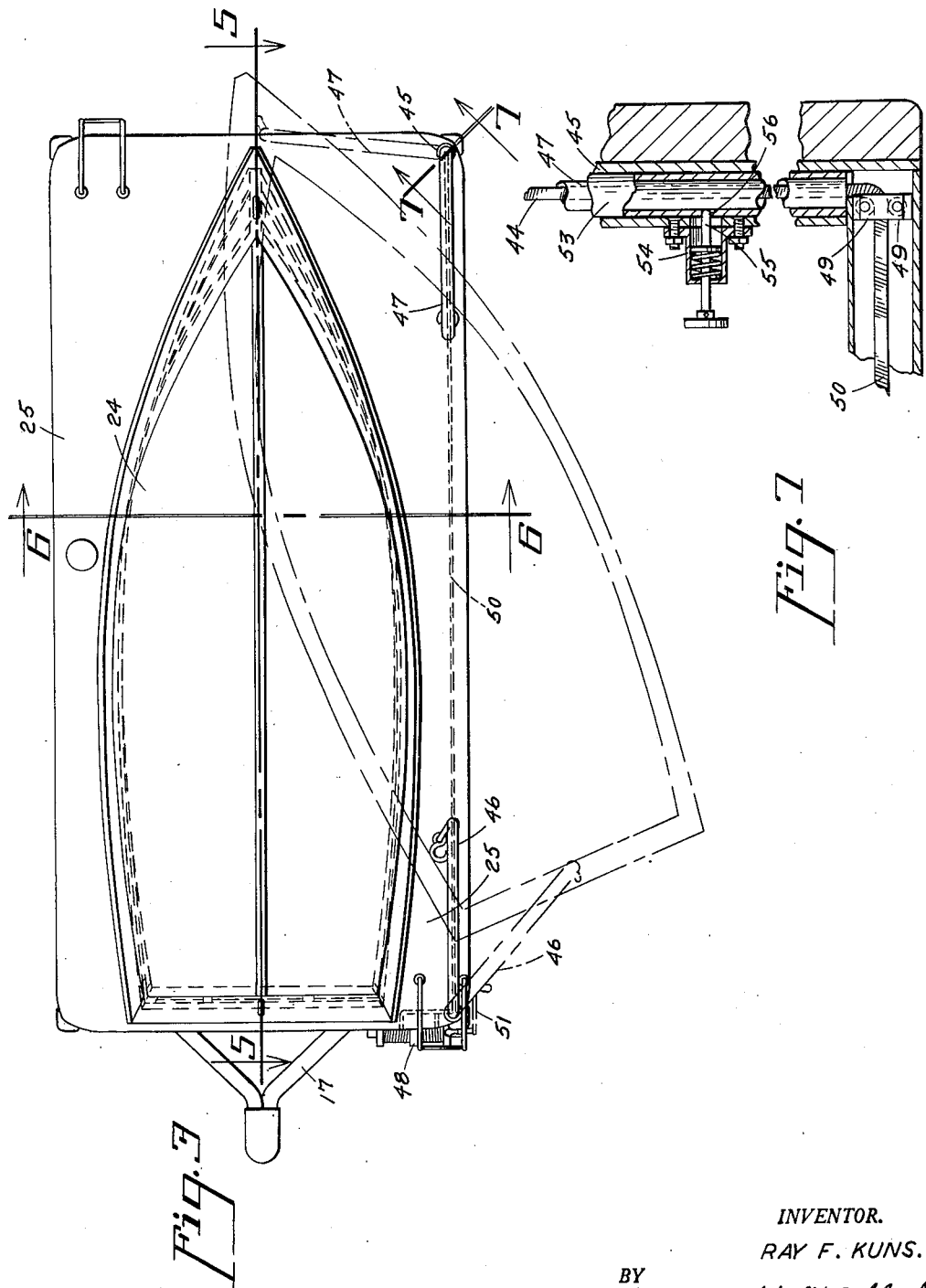
Fig. 3 is a top plan view of the vehicle of the invention, the boat being shown in full and broken lines respectively to correspond with the showing of Fig. 2.

Rigidly secured at their bottom ends at intervals along the edge of the floor structure 11 are a series of uprights 19 which extend upwardly to approximately shoulder height of an average sized person standing on floor 16. The uprights 19 are arranged in opposed relation on opposite longitudinal sides of the floor and each pair is connected at the top by a novel roof rafter member 20. Rafters 20 are each of integral fabricated construction made of plywood or any other suitable material. Each rafter 20 comprises a top cross member 21 at the ends of which are depending legs 22 which incline outwardly at the bottoms thereof where the integrally connected portions 23 project outwardly in a slightly downwardly sloping direction. The extreme ends of portions 23 are secured rigidly to the respective top ends of a pair of uprights so that a light weight and very sturdy supporting structure for the roof results. The odd shaped rafters 20 serve as the support and form for an elevated central longitudinal lantern type roof 24 and a relatively low longitudinal narrow catwalk or deck roof 25 on each side of said lantern roof (see Figs. 1 and 3).

The roof, floor and sidewalls may each comprise a single sheet of material, e. g. plywood, but may be made hollow and double faced as shown and described. The single construction merely omits the interior wall sheets and needs no separate illustration or description. Referring now to the drawings, plywood or metal sheets may be employed for the outer weatherproof wall 26 while a similar or dissimilar sheet material forms the interior wall structure 27. The sheets forming outer walls 26 and inner walls 27 are slightly secured to relatively opposite faces of uprights 19 to effect a mutual reenforcement therewith so that sturdy lightweight hollow walls are provided.

The rafters 20 are secured to the top of the several pairs of uprights 19 and these rafters impart structural support as well as form to the distinctively shaped and highly utilitarian roof structure. Additional rafters 20 of like construction are spaced between adjacent pairs of the first mentioned rafters and are positioned on the top edges of inner wall 27 and when the inner and outer sheets 28 and 29 forming the ceiling and roof are attached securely to all of the rafters a light-weight, hollow and strong top portion of the desired shape results. As in the case of the sidewalls, the several parts of the roof structure provide mutual reenforcement.

Those portions of sheets 28 attached to the inside faces of legs 22 of the rafters 20 and the opposed portions of the outer sheet 29 attached to the outer faces of said legs 22 have suitably located registering openings in which window frames 30 are mounted. These frames 30 carry suitably openable glazed window sashes 31 to afford light and ventilation when the house trailer is used for habitation. Windows 32 are provided in the sidewalls and ends of the trailer body in any desired manner.

In order to sustain the bending strain of the roof decks 25 and the lantern roof 24 which connects therewith along the inner longitudinal edges thereof, built in furniture in the nature of wardrobe cabinet 33 and combination kitchen cabinet 34 are secured relatively opposite each other against the longitudinal sidewalls approximately midway the ends thereof. The sidewalls of such cabinets support the roof deck portions at several places intermediate the ends transversely across the width of said decks. As can be best seen in Figs. 5 and 6 several of the rafters 20 are thus supported directly beneath the bottom ends of the legs 22.

Figures 4, 6:
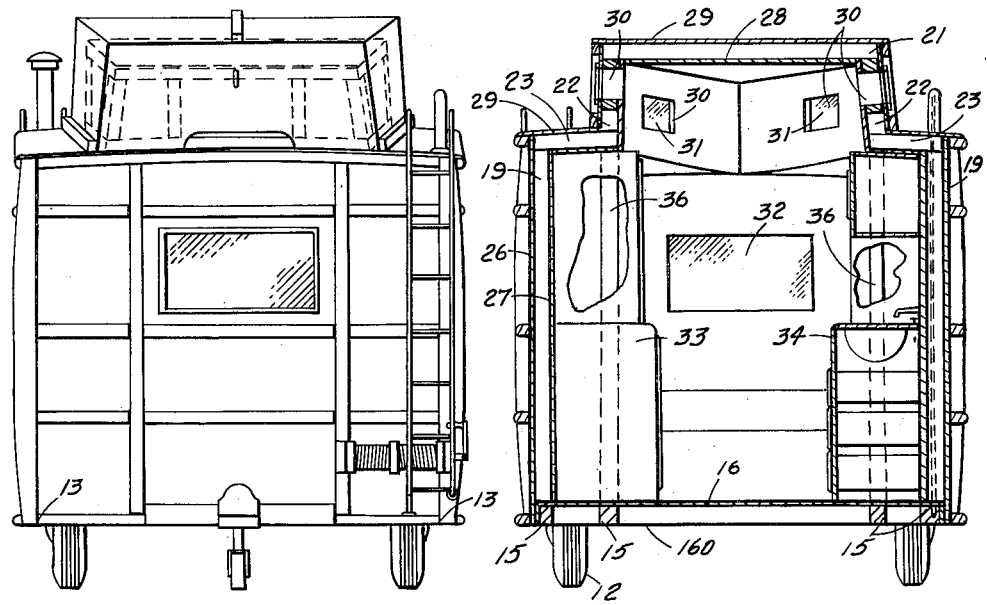
Fig. 4 is a front end elevational view of the trailer of the invention.
Fig. 6 is a cross-sectional view taken on line 6—6 of Fig. 3.
Figure 5:
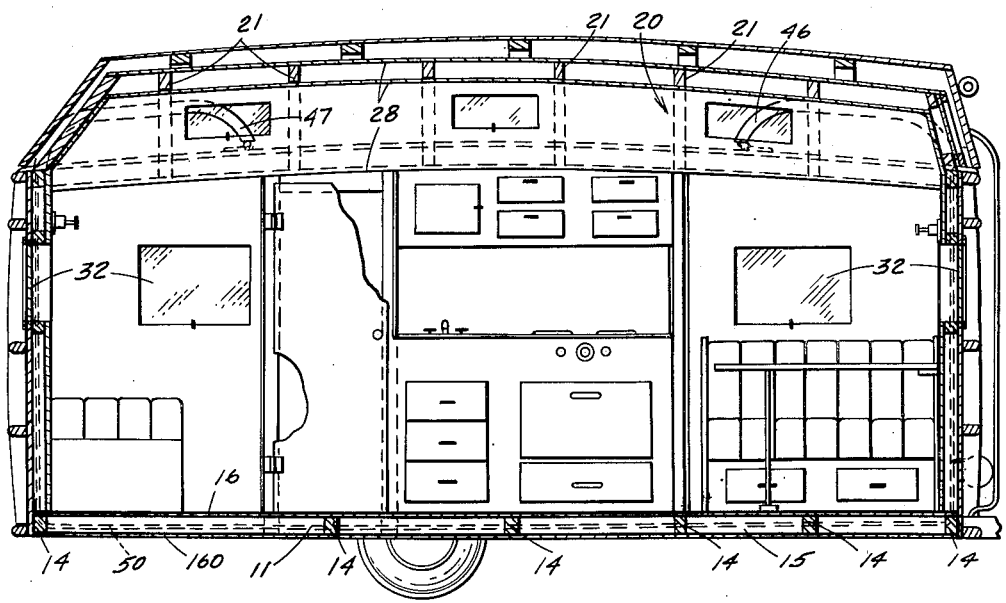
Fig. 5 is a cross-sectional view taken on line 5—5 of Fig. 3.

Accordingly the dead weight of the roof is taken at the critical locations by the taller pieces of built-in furniture and equipment and ample supporting strength is provided to support relatively large live load on top of the roof. The built-in furniture units 34 and 35 as illustrated in Fig. 6 may have at least one sturdy upright member 36 built into their lateral side walls directly below the legs 22 of the rafters 20, particularly in the event that very thin and light weight material is used in the construction of units 34 and 35.

External finish strips 36 and 37 serve to lend rigidity and pleasing external design to the house trailer and to cover joints in the external wall 26 as well as to protect the exterior finish of said wall surface against excessive scratching and wear.

Figure 2:
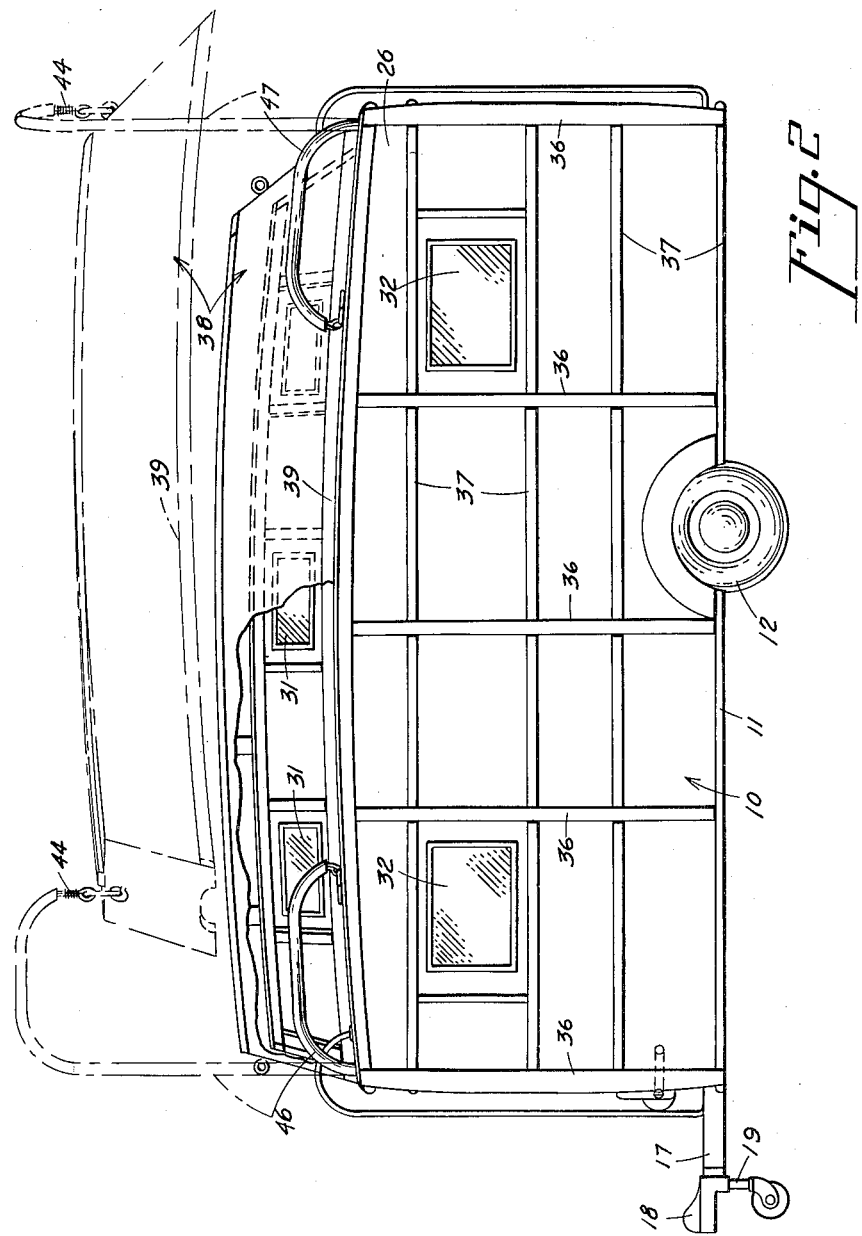
Fig. 2 is a side elevational view of the other side of the structure of Fig. 1 and showing in broken lines the operative position of the davits holding the boat clear of the roof.

The lantern roof 24 will be noted to be shaped like an inverted, substantially flat bottomed boat. This shape of the lantern roof coincides in size and shape with the interior of a boat 38 which boat is adapted to be let down over the lantern roof 24 to a position wherein the gunwales 39 of the boat rest squarely upon the roof deck portions 25 at the junction with the base of said lantern roof, while the inner sides and floor of said boat lightly contact the trim on the sides of said lantern roof and the top of the lantern roof respectively. The boat 38 is constructed of a series of one-piece U-shaped plywood cross beams 40 to which suitably connected sheets 41 and 42 are attached to form the sides and bottom of the boat so that no transverse obstruction exists inside the boat from gunwales to floor. The boat is provided at the prow and stern ends with fixed rings 43 adapted for connecting the ends of cables 44 thereto. Rigidly housed in two corners on a common side of the house trailer are tubes 45 which telescopically support hollow davit members 46 and 47 which may be raised from a normally lowered position below the level of the top of lantern roof 24 to an elevated position as shown in broken lines in Fig. 2 wherein the boat 38 may be raised entirely above the said lantern roof. The cable 44 which is housed in the tubular davit 46 has its one end passed through the front wall of the trailer and secured on the drum of a winch 48 mounted on the outer front wall. The cable housed in davit 47 is of greater length and is passed between guide pulleys 49 so that the reach 50 of said cable may pass beneath and parallel to the floor 16 from the rear of the trailer to the front thereof and then brought out and attached to the drum of winch 48. The winch may be of ordinary construction save that the two cables are simultaneously wound on separate portions of a common drum. A removable crank 52 is used to operate the winch. As can be noted from an inspection of Figs. 2, 3 and 7, the davits 46 and 47 are adapted to be manually raised vertically in their supports and swung radially about the vertical axes of their supports. As shown in detail in Fig. 7, an intermediate tube 53 is housed in support 45 and this rotatably supports the davit. When the davit and tube 53 are lifted vertically in support 45, a spring pressed latch pin device 54 fixed on support 45 may cause the end of its latch 55 to enter a perforation in tube 52 so that the latter and the davit carried thereby are securely retained in elevated relation for the purpose of placing the inverted boat 38 over the lantern roof or lifting it free of said roof.

In removing the boat the cables 44 are allowed to unwind freely as the davits are elevated, after which the ends of said cables are attached to the rings 43 on the boat. The winch 48 is now operated to wind the cables on its drum and the cables slide through the hollow davits, and lift the boat free of the lantern roof 24. Davit 46 is now swung radially until the stern of the boat is moved substantially free of the roof deck and the remaining davit 47 is then swung outwardly at substantially right angles to the side of the house trailer. During this movement of davit 47 the companion davit 46 also shifts radially into substantial parallelism with davit 47 and the boat may be lowered to the ground or onto an immediately adjacent body of water by operating the winch for paying out the cables 44. The boat may be replaced on the roof for storage or road travel by a substantial reversal of the operations just described and in a manner that is readily understood.

The operation of removing and replacing the boat is not an arduous task and is readily performed by either one or two persons despite the relatively large size of the boat. The arrangement facilitates the safe storage of the boat overnight by camper tourists near unfamiliar lakes and rivers where dock facilities are lacking.

The previously mentioned structural strength of the light-weight roof structure affords ample safety to sustain the live load of the boat and persons manipulating the boat to and from its position of secure nested mounting on the roof. Ladders 57 are attached to the front and rear ends respectively to afford easy access to the roof.

It will be understood that when the house trailer is used for living quarters and the boat is not in use, the benefits of light and ventilation through the lantern roof may be had by merely elevating the boat on the davits sufficiently to clear the lantern roof.

Various of the structural details will be understood to be subject to modification within the spirit of the invention and the appended claims.

What is claimed is:

1. In a house trailer the combination of a tractionally mounted platform floor structure, relatively low upright walls supported at the longitudinal sides and the ends of said platform, narrow substantially horizontal roof decks supported at the ends by said endwalls and along one side by one of the respective longitudinal sidewalls and overhanging the side edge margins of the floor structure, built in furniture members disposed substantially within said side edge margins of the floor and having the tops thereof substantially uniform in height with the sidewalls and serving as transverse structural bearing supports for the respective overhanging roof decks intermediate the ends thereof, and a lantern roof comprising windowed upright sidewalls supported on the bottom edges by the inner overhanging edges and a roof section attached to and extending between the top edges of the windowed sidewalls and forming therewith an unobstructed ventilated head room space in the trailer between the edge marginally located furniture and extending upwardly above the level of said furniture and the roof decks supported thereon.

2. In a house trailer the combination of a platform floor, relatively low trailer sidewalls supported at the opposed longitudinal edges of said floor, substantially horizontal narrow roof decks supported at one edge on the top edge of each sidewall and extending in overhanging relation with predetermined edge margins along the longitudinal side edge margins of the floor, built in furniture members disposed in opposed relation on the respective edge margins of the floor intermediate the ends thereof, said furniture members being substantially coextensive in height with the trailer sidewall and attached thereto, said furniture members forming transverse bearing supports for the overhanging roof decks intermediate the ends thereof, and a windowed interiorly unobstructed lantern roof structure connected at its bottom edges with the inwardly overhanging edges of said roof deck, and forming a ventilating roof section above the level of the roof decks over the free floor space between the opposed built in furniture members.

3. In a house trailer a tractionally supported floor, relatively low sidewalls and end walls supported at the edges of the floor, roof decks supported at the ends and one side by the endwalls and the respective sidewalls and overhanging a predetermined edge margin of the floor, built in furniture members located in substantially opposed relation in the longitudinal edge margins intermediate the ends and forming bearing supports for the overhanging roof decks intermediate the ends thereof, an interiorly unobstructed, inverted, boat-shaped lantern roof forming an elevated closure for the space between said inwardly overhanging roof decks, an interiorly unobstructed boat formed to seat in inverted relation on the roof decks in nested relation over the lantern roof, hollow davits at opposite ends of the roof, a winch secured on an end wall of the trailer and a pair of independent cables simultaneously windable on said winch and passing through the respective hollow davits for attachment to opposite ends of the boat, said davits and winch controlled cables adapted to suspend the inverted boat over the lantern roof at selected distance above roof deck.

4. A fitted camping trailer comprising a tractionally supported platform floor, a pair of built in furniture members disposed in opposed spaced relation at the opposite sides of the floor intermediate the ends thereof, upright sidewalls and end walls at the sides and ends of the floor and extending upwardly substantially coextensive with the tops of said furniture members, a generally horizontal deck roof supported at its edges by said side and end walls, and having a longitudinally extending boat-shaped opening therethrough, said roof deck supported intermediate its ends on opposite sides of said opening by the tops of the opposed furniture members, a lantern type roof structure comprising openably windowed sides and connected with the roof deck along the edge of the boat-shaped aperture and extending upwardly appreciably above the top of the roof deck, a boat adapted to be inverted in nesting relation over the lantern roof and to rest on the roof deck at its juncture with the lantern roof, and davit members extending from the roof deck for moving the boat to and from the last named position, the davits adapted to suspend the inverted boat over the lantern roof in elevated relation thereto as a canopy for said lantern roof.

5. A fitted camping trailer comprising a tractionally supported platform floor, a pair of built-in furniture members disposed in opposed spaced relation at the opposite sides of the floor intermediate the ends thereof, upright sidewalls and end walls at the sides and ends of the floor and extending upwardly substantially coextensive with the tops of said furniture members, a generally horizontal deck roof supported at its outer edges by said side and end walls and having a longitudinally extending boat-shaped opening therethrough, said roof deck supported intermediate its ends on opposite sides of said opening by the tops of the opposed furniture members, a lantern type roof structure comprising windowed sides connected with the roof deck along the edge of the boat shaped aperture and extending upwardly appreciably above the top of the roof deck, said lantern roof adapted to have a conformable and interiorly unobstructed boat inverted in nesting relation over the lantern roof and to rest on the roof deck at its juncture with the lantern roof, tubular davit members each including a radially swinging arm section adapted to be telescopically adjusted to positions above and below the level of the top of the lantern roof and cables therethrough for connection with and manipulation of said boat.

RAY F. KUNS.

REFERENCES CITED

The following references are of record in the file of this patent:

UNITED STATES PATENTS

| Number | Name | Date |
|---|---|---|
| D. 69,420 | Wiedman | Feb. 9, 1926 |
| D. 146,232 | Patterson | Jan. 14, 1947 |
| D. 148,935 | Kuns | Mar. 9, 1948 |
| 1,548,527 | Hillgren | Aug. 4, 1925 |
| 2,266,769 | Kramer | Dec. 23, 1941 |
| 2,310,431 | Hart | Feb. 9, 1943 |
| 2,354,740 | Couse | Aug. 1, 1944 |
| 2,395,173 | Dobler | Feb. 19, 1946 |

FOREIGN PATENTS

| Number | Country | Date |
|---|---|---|
| 19,438 of 1911 | Great Britain | June 6. 1912 |
| 361,190 | Great Britain | Nov. 19, 1931 |

OTHER REFERENCES

Article entitled: "When is a Flivver not a Flivver?" published on page 17 of "The Evening Star," Washington, D. C., April 11, 1924.

Article entitled: "Evangelist's Car," pages 25, 68 and 69 of "Motor Vehicle Monthly," December 1924.